Jan. 11, 1938.　　　　L. T. ELIEL　　　　2,104,976
APPARATUS FOR AERIAL PHOTOGRAPHY
Filed Feb. 29, 1936　　　2 Sheets-Sheet 1
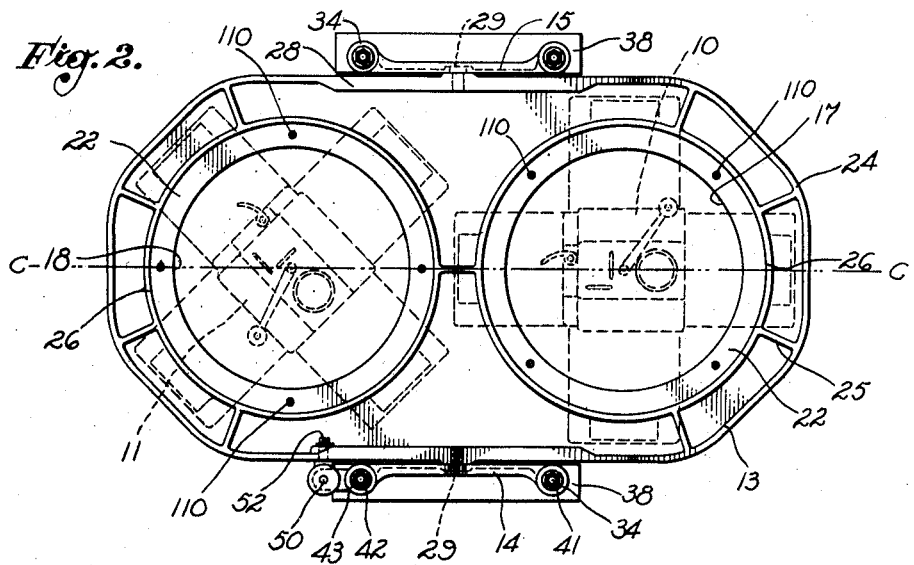
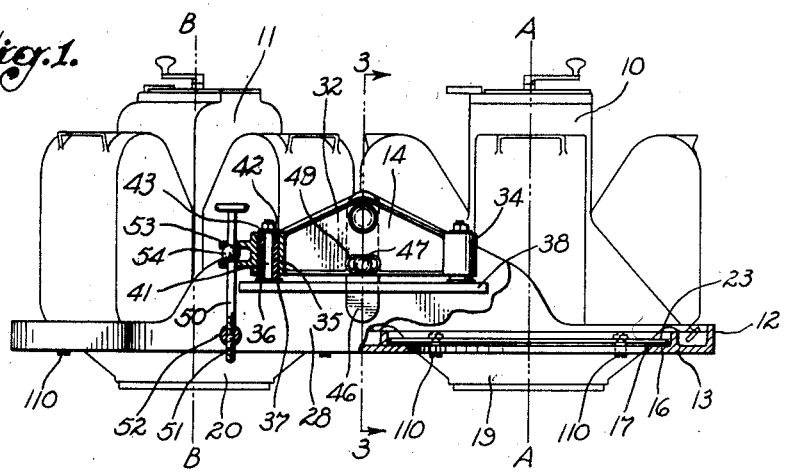
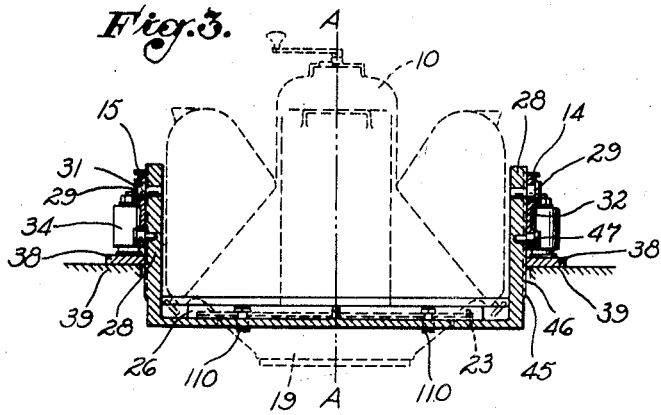
INVENTOR
LEON T. ELIEL
BY
ATTORNEY.

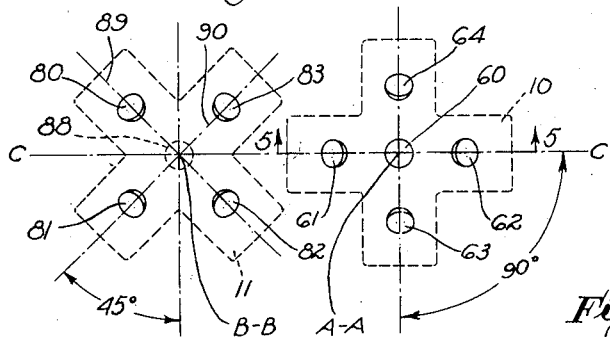
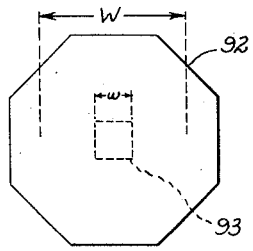
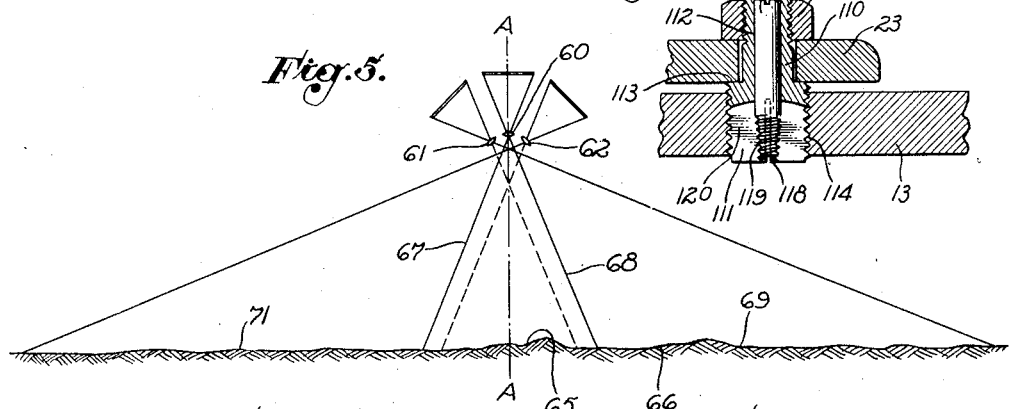
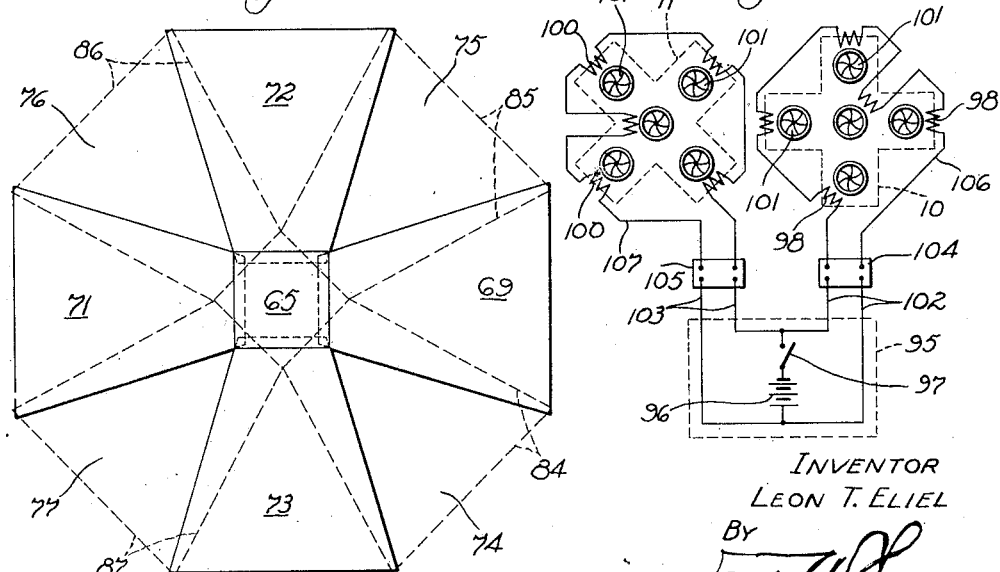

Patented Jan. 11, 1938

2,104,976

UNITED STATES PATENT OFFICE 2,104,976

APPARATUS FOR AERIAL PHOTOGRAPHY

Leon T. Eliel, Pasadena, Calif.

Application February 29, 1936, Serial No. 66,423

23 Claims. (Cl. 95—18)

My invention relates to aerial photography, and is particularly directed to apparatus employed in an aerial vehicle for obtaining consecutive overlapping photographs of terrain for map purposes.

It is an object of the invention to provide a simple means using standard photographic equipment for increasing the area of terrain covered in a single line of flight, to reduce the number of photographically obtained pictures required for the production of a map of a given area, to increase the air base distance, and to reduce the number of control points required for the making of a map of a given area. By the simple expedient of increasing the scope of a camera assembly used in photographing a terrain, it is possible to reduce the number of pictures required to cover the area which is to be mapped, and since standard requirements for the making of maps by this method require that for each given number of aerial pictures, or operations of the camera equipment, a control point obtained by ground survey should be used, the reduction in the total number of pictures required to photograph a given area reduces the number of control points which must be employed. The increased distance between exposures affords a longer and more favorable air base distance than is available by conventional practice.

It is an object of my invention to provide a simple means whereby a plurality of aerial cameras may be operated simultaneously to produce a composite photographic picture which will include a greatly larger area of terrain than is included in a photograph taken by a single-lens aerial camera from the same elevation. For example, a composite photograph may be obtained having a useful area sixteen times the area of a photograph produced by a single-lens camera at the same elevation.

Multiple-lens cameras are now in use, common among these being the five-lens camera which photographs a central area and wing areas extending outwardly from the central area in the shape of a Maltese cross with V-shaped hiatuses or openings consisting of unphotographed areas between the wing areas. Cameras having a lesser number of lenses, such as, for example, a four-lens camera, photograph areas in the form of an incomplete Maltese cross.

It is an object of my present invention to provide a means and method for producing a large composite photograph completely covering a large area, by the use of a multiple-lens camera of the character above set forth, and an auxiliary camera, which may also be of multiple-lens type, set in side-by-side relation to the first mentioned camera. The first of the two cameras produces a composite photograph of a central area and a number of wing areas radiating from the central area, and the second camera photographs the spaces or hiatuses between the wing areas photographed by the first of the cameras.

It is a further object of the invention to provide a means for supporting a plurality of cameras in side-by-side relation whereby to produce results such as hereinabove set forth, such means being capable of simultaneously adjusting the complement of cameras with relation to the terrain to be photographed. A valuable feature of the invention is that the supporting means is equipped so that the cameras are relatively adjustably held in cooperative relation.

Also, it is an object of the invention to provide means for operating all of the shutters of the cameras simultaneously so that all unit photographs of the multiple-lens group will be exposed at the same spacial disposition and the images projected through the lenses of these cameras will be complementary and when processed and assembled will produce a composite photograph or picture of a large area of terrain, as though taken with a single, very wide angle lens.

Further objects and advantages of the invention will be brought out in the following part of the specification.

Referring to the drawings, which are for illustrative purposes only,

Fig. 1 is a partly sectioned elevational view of a preferred form of my camera mounting device with a pair of cameras supported therein.

Fig. 2 is a plan view corresponding to Fig. 1, in which the cameras are shown in dotted lines so that the mounting device may be better seen.

Fig. 3 is a cross section on a plane indicated by the line 3—3 of Fig. 1, this view showing one of the cameras in dotted lines.

Fig. 4 is a schematic plan view showing the relative positions of the lenses of the camera assembly shown in Fig. 2.

Fig. 5 is a schematic view, to reduced scale and in the plane indicated by the line 5—5 of Fig. 4, for showing the manner in which the oblique lenses photograph wing areas radiating from a central area.

Fig. 6 is a view showing diagrammatically the central area and wing areas photographed by use of a camera assembly such as described herein.

Fig. 7 is a diagrammatic view showing a comparison of the areas photographed by my multiple camera arrangement and by a single lens camera.

Fig. 8 is a diagram showing the electrical actuating means of my invention.

Fig. 9 is an enlarged fragmentary sectional view showing an adjustable stud which may be employed to relatively adjustably secure the cameras upon the support.

In Figs. 1 and 2 of the drawings, I show a pair of cameras 10 and 11, carried in operative relation on a camera mounting device 12 including a mounting frame or plate 13 adjustably supported by means of bracket members 14 and 15. The mounting plate 13 has a bottom wall 16 with openings 17 and 18 through which the lower portions 19 and 20 of the cameras 10 and 11 project when such cameras are secured to the plate 13.

Around each of the openings 17 and 18 is a substantially flat and horizontal surface 22 above which the mounting flange 23 of the camera 10 or 11 is secured. For the purpose of stiffening the mounting frame 13, it is provided with an upstanding edge wall 24 and a number of ribs 25 and 26 projecting upwardly from its upper face in the manner clearly shown in Fig. 2. It will be noted that the ribs 26 are concentric with the openings 17 and 18 and outline the mounting surfaces 22.

On each side of the plate 13 there is an upwardly projecting wall 28. Each of the walls 28 carries near its upper edge an outwardly projecting trunnion 29, which, as clearly shown in Fig. 3, engages or is seated in an opening 31 in the upper portion of the side wall 32 of a bracket 14 or 15. Each bracket 14 and 15 has a pair of vertical cylinders 34, these cylinders being formed at the outer ends of the side wall 32 of each bracket. In the vertical opening of each cylinder 34 is a cylindrical body of rubber 35 which is in non-sliding engagement with the wall of the cylinder 34, and the lower end 36 of which projects below the lower end of the cylinder 34 so as to engage an abutment or elevated portion 37 formed on a horizontal plate 38 adapted to be secured to a structural member 39 of an aerial vehicle, such as an airplane. This structural member 39 may be a portion of the floor of the airplane, which is substantially level when the airplane is in flight, or it may be a built-in structure added to the airplane for the purpose of providing a level support for the plates 38. Four studs 41, two for each of the brackets 14 and 15, are projected upwardly from the abutments 37 of the plates 38 in such positions that they will pass through vertical openings in the rubber bodies 35. Nuts and washers 42 and 43 are employed on the upper ends of the studs 41 to secure the brackets 14 and 15 thereon. Through the use of the rubber bodies 35, a non-resonant or cushioned connection of the brackets 14 and 15 to the plates 38 and thence to the structural member 39 is provided, whereby to minimize the transmission of vibration from the aerial vehicle to the camera assembly.

To minimize side sway of the mounting 13, the side walls 28 of the plate 13 are provided with projecting portions 45 having vertical faces 46 against which the side walls 32 of the brackets 14 and 15 rest. The lower portions of the side walls 32 are held against the surfaces 46 by means of flanged pins 47 which project outwardly from the walls 28 and through arcuate openings 49 in the bracket side walls 32.

The mounting device 13 is mounted in the aerial vehicle in longitudinal position, that is, with the center line C—C corresponding to the line of flight of the airplane. With this condition of mounting in force, the trunnions 29 lie in an axis which is perpendicular to the line of flight and horizontal with relation to the ground. The angle of flight or the angle of incidence of an airplane varies with the placing of the load thereon, and ordinarily as the fuel carried by the airplane is consumed, the distribution of the load will be changed so that the angle of incidence of the airplane will vary a small amount. The mounting device provides a means whereby the plate 13 and the cameras 10 and 11 carried thereby may be rotated on the horizontal axis defined by the trunnions 29, this adjustment being either for the purpose of initially adjusting the plate 13 and the cameras to a level position or for compensating for the change in the angle of flight of the airplane from time to time due to a change in the distribution of the load, without changing the correlative alignment and positioning of the cameras 10 and 11. This means, as shown in Figs. 1 and 2, consists of a screw 50 which connects the bracket 14 with an eccentric point on the mounting plate 13. The screw 50 has a threaded lower end 51 which passes through a threaded opening in a pin 52 which projects laterally from the side of the mounting plate 13 in such a manner that it may rotate slightly as the mounting plate 13 is swung by the action of the screw. The upper portion of the screw 50 may pass through a pair of spaced projections 53 extending from a bracket 14, an abutment member such as a drilled metal bar 54 being secured on the screw 50 between the projecting members 53. The screw 50 may therefore be rotated in the projections 53 but cannot be moved vertically.

The cameras 10 and 11 shown in Figs. 1 and 2 are of the five-lens type. The arrangement of the lenses of this type of camera is as shown in the diagrammatic plan view, Fig. 4. Referring to the camera 10, there is a central lens 60 disposed on the central axis best indicated as A—A of Fig. 1, and four oblique wing lenses 61, 62, 63, and 64, so called for the reason that their optical axes are disposed in oblique relation to the axis of the central lens 60 and that they are adapted to photograph wing areas which radiate from a central area of the terrain being photographed. This relationship of the lenses may be explained with relation to Fig. 5, wherein the central lens, being disposed on the vertical axis A—A, photographs a central area 65 of a terrain 66 between the lower ends of the lines 67 and 68 representing the angular scope of the lens 60. The central area 65 is also indicated in Fig. 6. The oblique lens 61 is disposed so that it will photograph a wing area 69 radiating rightwardly from the central area 65, and the lens 62 is placed so that it will photograph a wing area 71 lying to the left of the central area 65. In a similar manner, the oblique lenses 63 and 64 photograph wing areas 72 and 73 shown in Fig. 6.

As shown in Fig. 6, the area photographed by the five lenses of the camera 10 is in the form of a Maltese cross, there being hiatuses 74, 75, 76, and 77, consisting of V-shaped spaces between the wings 69, 71, 72, and 73 of the area of terrain photographed by a single action of the camera. In my invention I provide a simple means, as referred to in the introduction to this specification, for photographing the hiatuses existing between the wing areas which radiate from the central area 65. As shown in Fig. 4, a plurality of oblique lenses 80, 81, 82, and 83 are disposed around the vertical axis B—B which is disposed in side-by-side relationship to the axis A—A, and in such position that these lenses 80 to 83 inclusive will respectively photograph wing areas 84, 85, 86, and 87, indicated in dotted lines in Fig. 6, which supplementary wing areas cover the hiatuses 74, 75, 76, and 77. If, as previously described, the first multiple-lens camera 10 is of five-lens type, then the second camera 11 may also be of five-lens type having a central lens 88 indicated in dotted lines in Fig. 4, and if the first camera 10 is so placed that the lenses 61 and 62 coincide with the center line C—C, then the lenses 80, 81, 82, and 83 will lie on lines 89 and 90, Fig. 4, disposed at angles of 45° relative to the center line C—C. The central lens 88 of the second camera 11 need not be used for the reason that the central area 65 of Fig. 6 is photographed by the lens 60 of the camera 10; therefore, to use the lens 88 in its customary manner would result in the taking of two photographs of the area 65. In one practice of the invention, however, the lens 88 may be employed to photograph on a film a record of conditions under which the cameras 10 and 11 have been operated, for example, number of the picture, altitude of the airplane, time of day, date, job number, compass bearing, and other pertinent data.

By use of the lens and camera arrangement previously described, a composite picture such as indicated in Fig. 7 may be produced. This composite photograph has an outline or periphery indicated by a line 92, and the area of the composite photograph has an effective width W which is substantially four times the width w of the photograph 93 taken by a single-lens camera, or, in other words, by the lens 60 disposed on a vertical axis as is customary in the use of single-lens aerial cameras.

A further feature of the invention is to provide a means for simultaneously actuating the lenses of both cameras 10 and 11 in a substantially instantaneous manner so that all of the entire area indicated in Fig. 6 will be photographed at one time. For this purpose I provide, as shown in Fig. 8, an actuator 95 having a source of electric energy represented by a battery 96 and a control means represented by a switch 97. From the actuator 95 a plurality of cables are extended for connection with electro-responsive elements 98 and 100 in the two cameras 10 and 11, these electro-responsive elements being shown in the form of solenoids associated with the shutters 101 for the lenses shown in Fig. 4. Cabled wires 102 and 103 extend from the actuator 95 to separable connectors 104 and 105 by which they are respectively connected to the electrical circuits 106 and 107 for energizing the solenoids 98 and 100. The control of electrical energy through both circuits is preferably accomplished by the single control switch 97 in order that all of the solenoids 98 and 100 will be energized at the same time, and consequently the shutters 101 will be simultaneously actuated in the complete camera assembly.

It is a feature of the invention to provide a support or mounting frame 13 with means for securing the cameras 10 and 11 in a relatively adjustable manner so that the cameras will have their axes A—A and B—B directed toward the same central area upon the ground. For this purpose, adjustable studs 110 are disposed around the openings 17 and 18 so as to project upwardly from the surfaces 22. As best shown in Fig. 9, these studs 110 comprise a cylindrical threaded body 111 with a stem 112 of reduced diameter extending upwardly therefrom so as to form a shoulder 113 at the upper end of the body 111 against which the mounting flange 23 of the camera 10 or 11 may rest. The body 111 screws into a threaded opening 114 in the member 13, and the upper end is provided with means whereby it may be rotated to raise or lower the shoulder 113 as may be required in the adjustment of one camera relative to the other. This rotating means I have shown as a screw-driver slot 115. After proper adjustment of the stud 110 is made, it may be locked in place by suitable means, such, for example, as an expanding screw 116 which extends downwardly through an opening 117 in the stud 110 and has a tapered threaded lower end 118 which screws into a tapered internal thread 119 within the body 111, such body being provided with diametral slots 120 so that the tapered thread 118 may expand it in the opening 114, thereby locking the stud 110 against rotation. The upper end of the stem 112 is threaded to receive a nut 122 for holding the flange 13 against the shoulder 113. The cameras 10 and 11 are correlatively adjusted on the member 13 so that the axes A—A and B—B are parallel. As far as all practical purposes are concerned, it may be considered that the axes A—A and B—B are identical for the reason that this small distance of separation is not perceptible, or is entirely negligible, in a plurality of photographs exposed at the same time on and around the axes A—A and B—B. The ordinary separation between the axes A—A and B—B is approximately twenty-one inches, and this distance on the terrain, when reduced in scale on a photograph taken from a height of from 15,000 to 25,000 feet, is infinitesimal.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A device of the character described for aerial photography, including: a pair of multiple-lens cameras in side-by-side relation, one of said cameras being so placed relatively to the other of said cameras that it will photograph areas of terrain in the hiatuses between areas on said terrain photographed by the other of said cameras.

2. A device of the character described for aerial photography, including: a pair of multiple-lens cameras in side-by-side relation, one of said cameras being so placed relatively to the other of said cameras that it will photograph areas of terrain in the hiatuses between areas on said terrain photographed by the other of said cameras; supporting means securing said cameras correlatively immovable in said side-by-side relation; and means for simultaneously operating all of the shutters of both of said cameras.

3. A device of the character described for aerial photography, including: a rigid supporting member; means for securing said supporting member in operative position in an aerial vehicle and so that it may be rotated relatively to the vehicle; means operative to rotate said supporting member relatively to said vehicle as changes in the position of the vehicle may require the same; a multiple-lens camera secured to said supporting member, said camera having lenses for photographing areas on a terrain, there being hiatuses between said areas; and a second camera on said supporting member in side-by-side relation thereto, having a lens placed so as to photograph an area on said terrain in one of said hiatuses between two of said first named areas.

4. A device of the character described for aerial photography, including: a rigid supporting member; means for securing said supporting member in operative position in an aerial vehicle so that it may be rotated at least on a horizontal axis for leveling adjustment; a multiple-lens camera secured to said supporting member, said camera having lenses for photographing areas of a terrain, there being hiatuses between said areas; and a second camera on said supporting member in side-by-side relation thereto, having a lens placed so as to photograph an area of said terrain in one of said hiatuses between two of said first named areas.

5. A device of the character described for aerial photography, including: a supporting member comprising a substantially flat plate having a pair of vertical openings therein and having pivot means at each side thereof; a pair of brackets for securing said supporting member in operative position in an aerial vehicle, one of said brackets being connected to one of said pivot means, and the other of said brackets being connected to the other of said pivot means; adjustment means for swinging said plate on said pivot means; a multiple-lens camera secured to said supporting member, said camera having lenses for photographing areas of a terrain, there being hiatuses between said areas; and a second camera on said supporting member in side-by-side relation thereto, having a lens placed so as to photograph an area of said terrain in one of said hiatuses between two of said first named areas.

6. A device of the character described for aerial photography, including: a supporting member comprising a substantially flat plate having a pair of vertical openings therein and having pivot means at each side thereof; a pair of brackets for securing said supporting member in operative position in an aerial vehicle, one of said brackets being connected to one of said pivot means, and the other of said brackets being connected to the other of said pivot means; adjustment means for swinging said plate on said pivot means; a multiple-lens camera secured to said supporting member, said camera having a central axis and lenses around said central axis for photographing areas of a terrain, there being hiatuses between said areas; and a second camera on said supporting member in side-by-side relation thereto, having lenses disposed around a central axis substantially parallel to said first named central axis and being so placed as to photograph areas of said terrain in separate hiatuses between areas photographed by said lenses of said first named camera.

7. A device of the character described for aerial photography, including: a pair of cameras in side-by-side relation each having a central axis and a plurality of wing lenses around said central axis so as to photograph wing areas of a terrain radiating from a central area of said terrain, at least one of said cameras having a central lens to photograph said central area, and one of said cameras being so placed relatively to the other of said cameras that the wing lenses thereof will photograph wing areas of said terrain in the hiatuses between said wing areas of said terrain photographed by the other of said cameras.

8. A device of the character described for aerial photography, including: a pair of cameras in side-by-side relation each having a central axis and a plurality of wing lenses around said central axis so as to photograph wing areas of a terrain radiating from a central area of said terrain, at least one of said cameras having a central lens to photograph said central area, and one of said cameras being so placed relatively to the other of said cameras that the wing lenses thereof will photograph wing areas of said terrain in the hiatuses between said wing areas of said terrain photographed by the other of said cameras; supporting means securing said cameras correlatively immovable in said side-by-side relation; and means for adjusting said supporting means relative to a vehicle in which it may be carried.

9. A device of the character described for aerial photography, including: a pair of cameras in side-by-side relation each having a central axis and a plurality of wing lenses around said central axis so as to photograph wing areas of a terrain radiating from a central area of said terrain, at least one of said cameras having a central lens to photograph said central area, and one of said cameras being so placed relatively to the other of said cameras that the wing lenses thereof will photograph wing areas of said terrain in the hiatuses between said wing areas of said terrain photographed by the other of said cameras; supporting means securing said cameras correlatively immovable in said side-by-side relation; and means for simultaneously operating all of the shutters of both of said cameras.

10. A device of the character described for aerial photography, including: a pair of cameras in side-by-side relation each having a central axis and a plurality of wing lenses around said central axis so as to photograph wing areas of a terrain radiating from a central area of said terrain, at least one of said cameras having a central lens to photograph said central area, and one of said cameras being so placed relatively to the other of said cameras that the wing lenses thereof will photograph wing areas of said terrain in the hiatuses between said wing areas of said terrain photographed by the other of said cameras; supporting means securing said cameras correlatively immovable in said side-by-side relation; an electro-responsive operator connected to each of the shutters of both of said cameras; an actuator having a source of electric energy and a control means therefor; and a pair of conductor means connecting said source of electric energy and said control means with all of said electro-responsive operators, whereby all of said shutters may be actuated simultaneously.

11. A device of the character described for aerial photography, including: a rigid supporting member; means for securing said supporting member in operative position in an aerial vehicle; a multiple-lens camera secured to said supporting member, said camera having a central lens on a central axis and wing lenses around said central axis for photographing a central area of a terrain and wing areas radiating therefrom, there being hiatuses between said wing areas; and a second camera on said supporting member in side-by-side relation thereto, having an oblique lens placed so as to photograph a wing area of said terrain in one of said hiatuses between two of said first named wing areas.

12. A device of the character described for aerial photography, including: a rigid supporting member; means for securing said supporting member in operative position in an aerial vehicle so that it may be rotated at least on a horizontal axis for leveling adjustment; a multiple-lens camera secured to said supporting member, said camera having a central lens on a central axis and wing lenses around said central axis for photographing a central area of a terrain and wing areas radiating therefrom, there being hiatuses between said wing areas; and a second camera on said supporting member in side-by-side relation thereto, having an oblique lens placed so as to photograph a wing area of said terrain in one of said hiatuses between two of said first named wing areas.

13. A device of the character described for aerial photography, including: a supporting member comprising a substantially flat plate having a pair of vertical openings therein and having pivot means at each side thereof; a pair of brackets for securing said supporting member in operative position in an aerial vehicle, one of said brackets being connected to one of said pivot means, and the other of said brackets being connected to the other of said pivot means; adjustment means for swinging said plate on said pivot means; a multiple-lens camera secured to said supporting member, said camera having a central lens on a central axis and wing lenses around said central axis for photographing a central area of a terrain and wing areas radiating therefrom, there being hiatuses between said wing areas; and a second camera on said supporting member in side-by-side relation thereto, having an oblique lens placed so as to photograph a wing area of said terrain in one of said hiatuses between two of said first named wing areas.

14. A device of the character described for aerial photography, including: a rigid supporting member; means for securing said supporting member in operative position in an aerial vehicle; a multiple-lens camera secured to said supporting member, said camera having a central lens on a central axis and wing lenses around said central axis for photographing a central area of a terrain and wing areas radiating therefrom, there being hiatuses between said wing areas; and a second camera on said supporting member in side-by-side relation thereto, having oblique lenses disposed around a central axis substantially parallel to said first named central axis and being so placed as to photograph areas of said terrain in separate hiatuses between wing areas photographed by said wing lenses of said first named camera.

15. A device of the character described for aerial photography, including: a supporting member comprising a substantially flat plate having a pair of vertical openings therein and having pivot means at each side thereof; a pair of brackets for securing said supporting member in operative position in an aerial vehicle, one of said brackets being connected to one of said pivot means, and the other of said brackets being connected to the other of said pivot means; adjustment means for swinging said plate on said pivot means; a multiple-lens camera secured to said supporting member, said camera having a central lens on a central axis and wing lenses around said central axis for photographing a central area of a terrain and wing areas radiating therefrom, there being hiatuses between said wing areas; and a second camera on said supporting member in side-by-side relation thereto, having oblique lenses disposed around a central axis substantially parallel to said first named central axis and being so placed as to photograph areas of said terrain in separate hiatuses between wing areas photographed by said wing lenses of said first named camera.

16. A device of the character described for aerial photography, including: a rigid supporting member; means for securing said supporting member in operative position in an aerial vehicle; a five-lens camera secured to said supporting member, said camera having a central lens on a central axis and wing lenses around said central axis for photographing a central area of a terrain and wing areas radiating therefrom, there being hiatuses between said wing areas; and a second camera on said supporting member in side-by-side relation thereto, having an oblique lens placed so as to photograph a wing area of said terrain in one of said hiatuses between two of said first named wing areas.

17. A device of the character described for aerial photography, including: a rigid supporting member; means for securing said supporting member in operative position in an aerial vehicle; a five-lens camera secured to said supporting member, said camera having a central lens on a central axis and wing lenses around said central axis for photographing a central area of a terrain and wing areas radiating therefrom, there being hiatuses between said wing areas; and a second five-lens camera secured to said supporting member in side-by-side relation to said first named camera and having its oblique lenses placed so as to photograph four wing areas of said terrain in the hiatuses between the wing areas photographed by the wing lenses of said first named camera.

18. A support for holding a plurality of multiple-lens cameras in an aerial vehicle, comprising: a supporting member; pivotal means for connecting said supporting member to the aerial vehicle; means for moving said supporting member on said pivotal means; and adjustable means securing said cameras to said supporting member.

19. In equipment for aerial photography, a device for supporting a plurality of cameras so that they may be used to simultaneously photograph a terrain over which an aerial vehicle is flown, the combination of: a supporting member having means for securing said cameras thereto in complementary positions; means for mounting said supporting member in an aerial vehicle so that it may be adjusted relatively to the aerial vehicle as the position of flight of the vehicle changes; and means for holding said supporting member in any position of adjustment to which it may be moved.

20. In equipment for aerial photography, a device for supporting a plurality of cameras so that they may be used to simultaneously photograph a terrain over which an aerial vehicle is flown, the combination of: a supporting member having means for securing said cameras thereto in complementary position; means for mounting said supporting member in an aerial vehicle so that it may be adjusted relatively to the aerial vehicle as the position of flight of the vehicle changes; and means operative to move said supporting member through its different positions of adjustment.

21. In equipment for aerial photography, a device for supporting a plurality of cameras so that they may be used to simultaneously photograph a terrain over which an aerial vehicle is flown, the combination of: a supporting member having means for securing said cameras thereto in complementary positions and in fixed relation to each other; and a mounting member having means for securing it to said aerial vehicle and means for supporting thereon said supporting member so that said supporting member may be adjusted relatively to said aerial vehicle as the position of flight of the aerial vehicle changes.

22. In equipment for aerial photography, a device for supporting a plurality of cameras so that they may be used to simultaneously photograph a terrain over which an aerial vehicle is flown, the combination of: a supporting member having means for securing said cameras thereto in complementary positions and in fixed relation to each other; a mounting member having means for securing it to said aerial vehicle and means for supporting thereon said supporting member so that said supporting member may be adjusted relatively to said aerial vehicle as the position of flight of the aerial vehicle changes; and means operative to move said supporting member through its different positions of adjustment.

23. In equipment of the character described for photographing a terrain over which an aerial vehicle is flown, the combination of: a plurality of aerial cameras placed with their optical axes in complementary relation so that said optical axes of such cameras will be each directed to a separate area of the terrain; and means for mounting said cameras in said aerial vehicle in said complimentary relation and so that they may be moved relatively to the aerial vehicle as the position of flight of the aerial vehicle changes, there being means for maintaining said complementary relation of said optical axes of said cameras as they are moved relatively to said aerial vehicle.

LEON T. ELIEL.